Figure 1:
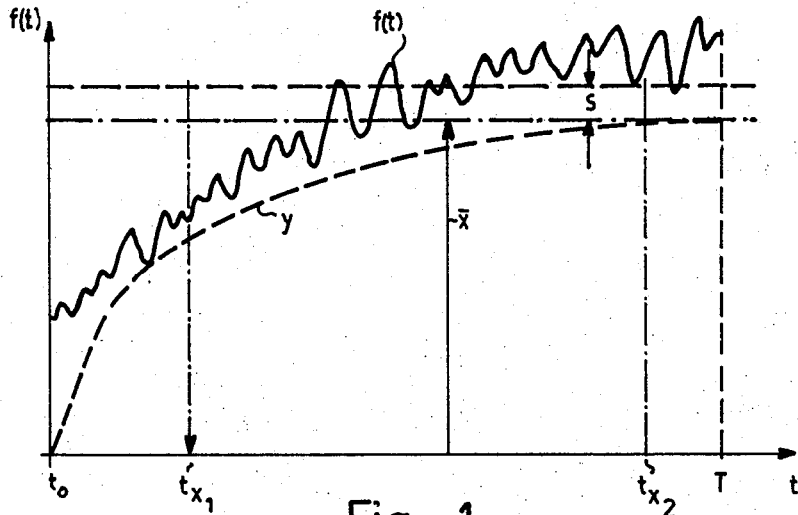

United States Patent [19]
Hoffmann

[11] 3,808,411
[45] Apr. 30, 1974

[54] METHOD AND APPARATUS FOR DETERMINING THE AVERAGE DEVIATION OF A VARIABLE FUNCTION FROM ITS MEAN VALUE

[75] Inventor: Dieter Hoffmann, Uster, Switzerland

[73] Assignee: Zellweger Ltd., Uster, Switzerland

[22] Filed: Aug. 31, 1971

[21] Appl. No.: 176,612

[30] Foreign Application Priority Data
Sept. 1, 1970 Switzerland.................... 13023/70

[52] U.S. Cl............... 235/151.3, 235/184, 235/193
[51] Int. Cl................................................ G06g 7/12
[58] Field of Search........ 235/193, 184, 183, 193.5, 235/194, 151.13, 151.3

[56] References Cited
UNITED STATES PATENTS
| | | | |
|---|---|---|---|
| 2,679,639 | 5/1954 | Locher........................ | 235/193 UX |
| 2,965,300 | 12/1960 | Radley et al................ | 235/193 |
| 3,082,949 | 3/1963 | Barker........................ | 235/193 X |
| 3,146,344 | 8/1964 | Palmer........................ | 235/151.13 |
| 3,147,370 | 9/1964 | Lowman..................... | 235/151.13 |

*Primary Examiner*—Joseph F. Ruggiero
*Attorney, Agent, or Firm*—Craig and Antonelli

[57] ABSTRACT

In order to determine the average quadratic deviation or coefficient of variation of a time variable function, a signal, representative of the function, is applied to a first resistor-capacitor integrating network and thereafter, the difference between the input signals to the network and the output signal of the network is obtained, and this difference signal is squared. The squared signal is then fed to a second integrating network, the square root of the output of the integrators obtained, and the ratio of the output of the first integrator and the square root is generated to provide the quadratic deviation. The time constants of each integrator network are variable and increase in direct proportion to the lapse of time from the start of the integration period.

27 Claims, 2 Drawing Figures

INVENTOR
DIETER HOFFMANN
BY Craig, Antonelli & Hill
ATTORNEYS

METHOD AND APPARATUS FOR DETERMINING THE AVERAGE DEVIATION OF A VARIABLE FUNCTION FROM ITS MEAN VALUE

In measuring technology, it is frequently necessary to determine the coefficient of variation of a variable function in a predetermined measuring interval, this coefficient of variation being based on the mean value of the function in the aforementioned measuring interval. One of the requirements which has to be satisfied in this connection is that the coefficient of variation should be determined with sufficient accuracy irrespective of the length of the measuring interval. In other words, the measured coefficient of variation should correspond at any time during measurement to the actual coefficient of variation of the interval, evaluated from the beginning of measurement of the function being investigated.

Unfortunately, the aforementioned average value is only available with sufficient accuracy at the end of the particular measuring interval so that continuous determination of the coefficient of variation would not seem to be readily possible.

The coefficient of variation, also known as the average quadratic deviation, of a function $f(t)$ is mathematically defined as follows:

$$CV_{th} = \frac{1}{\bar{x}} \sqrt{\frac{1}{T} \int_0^T [f(t) - x]^2 dt} \quad [1]$$

in which $$\bar{x} = \frac{1}{T} \int_0^T f(t) \cdot dt$$

represents the aforementioned average value of the function while O and T represent the limits of the measuring interval.

Methods of avoiding the difficulties referred to above have become known from the science of statistics. It can be shown for example that $$CV = \frac{1}{\bar{x}} \sqrt{\frac{1}{T} \int_0^T [f(t) - x]^2 dt} = \frac{1}{\bar{x}} \sqrt{\frac{1}{T} \int_0^T [f(t)]^2 dt - \bar{x}^2}$$

[2]

It is sufficient in this case continuously to determine $$\frac{1}{T} \int_0^T [f(t)]^2 dt$$

and the associated $\bar{x}^2$.

Unfortunately, this method has the disadvantage that the two expressions $$\frac{1}{T} \int_0^T [f(t)]^2 dt \quad \text{and} \quad \bar{x}^2$$

are very much greater than their difference. To enable this difference to be determined with sufficient accuracy, it is necessary for each of the two expressions to be determined with an accuracy that is almost impossible to achieve in practice.

Another known possibility is based on the fact that the coefficient of variation can be calculated as follows:

$$CV_{th} = \frac{1}{\bar{x}} \sqrt{\frac{1}{T} \int_0^T [f(t) - \bar{\bar{x}}]^2 dt - [\bar{x} - \bar{\bar{x}}]^2}$$

in which $\bar{\bar{x}}$ represents an arbitrary fixed value, the so-called provisional average value.

If the average value $\bar{x}$ only changes slightly with increasing T, $\bar{\bar{x}}$ can readily be selected in such a way that $(\bar{x} - \bar{\bar{x}})^2$ remains small with the result that no serious errors occur during subtraction. In practice, however, $\bar{x}$ can undergo considerable fluctuations with increasing T and $(\bar{x} - \bar{\bar{x}})^2$ can easily become very much greater than the difference $$\frac{1}{T} \int_0^T [f(t) - \bar{\bar{x}}]^2 dt - [\bar{x} - \bar{\bar{x}}]^2$$

so that in this case, too, the difference can only be calculated with sufficient accuracy if the two expressions are determined with a very high degree of accuracy which in practice involves very considerable outlay in terms of costs.

Electronic solutions are also known in which the function $f(t)$, i.e. an electrical signal corresponding to this function, is delivered to an RC-network with a relatively small time constant. A voltage $z$ which under favorable conditions approximates the value $\bar{x}$, is formed relatively quickly at the beginning of the measuring interval through the capacity of this RC-network.

Thereafter $f(t) - z$ is formed and $[f(t) - z]^2$ is obtained by squaring. This quantity is fed to a second RC-network in which the value RC is proportional at any moment during the period which has elapsed since the beginning of measurement. It is known that an accurate integration can be realized in this way so that the value $$\mu = \frac{1}{T} \int_0^T [f(t) - z]^2 dt$$

is formed at the capacitor. This value is delivered to root extracting network and subsequently divided by $z$, giving $$CV_{eff} = \frac{1}{z} \sqrt{\frac{1}{T} \int_0^T [f(t) - z]^2 dt} \quad [4]$$

Comparison of formula [4] with formula [1] shows that there is a certain similarity. $CV_{eff}$ would be equal to $CV_{th}$ if $z$ were equal to $\bar{x}$. In practice, however, $z$ is not a constant and in some cases is vastly different from $\bar{x}$, so that $CV_{eff}$ can differ considerably from $CV_{th}$. Accordingly, the error in measurement can be considerable.

The present invention takes into account the requirements which the accuracy of measurement has to satisfy with a minimum of outlay and relates to a method of determining the average quadratic deviation of a variable function from its mean value using variable RC - networks with a time constant increasing from a minimum value, and is distinguished by the fact that the value $$y = \frac{1}{T}\int_0^T f(t)\,dt$$

is formed in a first variable RC-network, is delivered to a subtractor and the difference between the function value $f(t)$ and $y$ is formed and the square of this difference $[f(t) - y]^2$ is produced in a following squaring network, after which this squared difference is applied to a second variable RC-network, the output signal $$s^2 = \frac{1}{T}\int_0^T [f(t) - y]^2 dt$$

of this second RC-network is fed to root-extracting network which forms the value.

$$S = \sqrt{\frac{1}{T}\int_0^T [f(t) - y]^2 dt}$$

which value $s$ following division by $y$ can be indicated as CV.

The invention also relates to an apparatus for carrying out the method comprising a first variable RC-network for forming the quantity $$y = \frac{1}{t}\int_0^t f(t)\,dt$$

a subtractor for subtracting the instantaneous value of $y$ from the instantaneous value of the function $f(t)$ and the squaring network for forming the square $[f(t) - y]^2$ and a second variable RC-network for forming $$S^2 = \frac{1}{T}\int_0^T [f(t) - y]^2 dt$$

after which the function $f(t)$ has its coefficient of variation CV = $s/y$ formed by suitable means.

The invention is described in detail in the following with reference to the accompanying drawings, wherein:

FIG. 1 shows a variable function, its average value and the average deviation.

Figure 2:
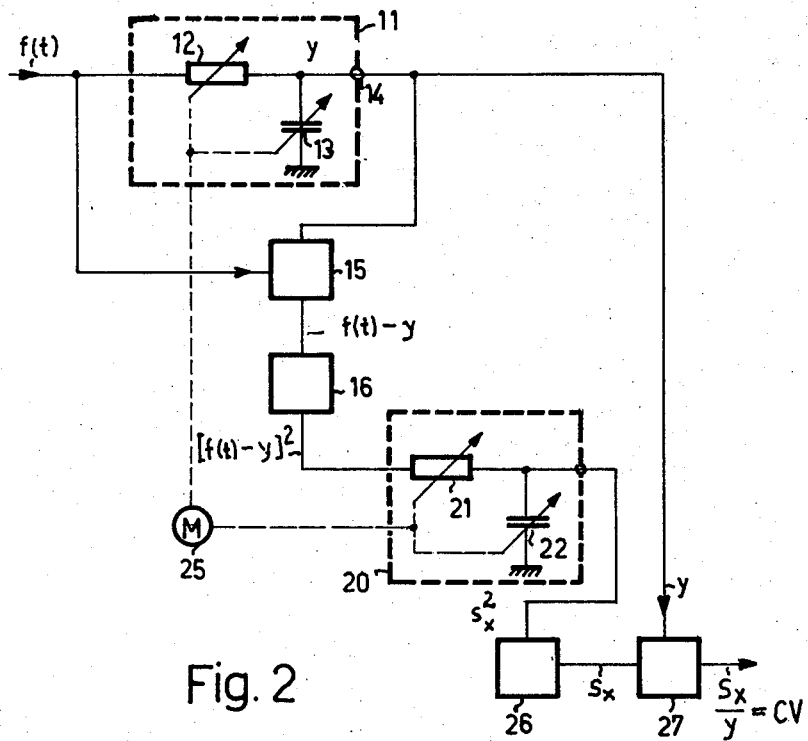

FIG. 2 diagrammatically illustrates the structure of a circuit according to the invention.

A variable function $f(t)$ is shown as a function of time $t$ (or the regarded length $l$) in FIG. 1 in a right-angled co-ordinate system. Its average value is denoted $\bar{x}$. It can now clearly be seen that initially the size of $\bar{x}$ is governed by the length selected for the measuring interval, i.e., the zone $t_o$–$t_x$. In a measuring interval $t_o$–$t_{x1}$ the average value $\bar{x}$ will be lower than it is in a measuring interval $t_o$–$t_{x2}$. These differences are very noticeable in the case of short measuring intervals in particular. In addition, they also influence the size of the average deviation or coefficient of variation CV because this is inversely proportional to the average value $\bar{x}$.

Accordingly, if the coefficient of variation is to be accurately measured, it is essential to have an accurate average value as well.

Attempts were made initially to treat these circumstances theoretically and in this way to design the necessary apparatus for determining the coefficient of variation. As already mentioned at the beginning, the theoretical coefficient of variation is expressed by $$CV_{th} = \frac{1}{\bar{x}}\sqrt{\frac{1}{T}\int_0^T [f(t) - x]^2 dt} \qquad y = \frac{1}{t}\int_0^t f(t)\,dt$$

$$\text{where} \qquad \bar{x} = \frac{1}{T}\int_0^T f(t)\,dt$$

So far as the measuring problems in question are concerned, the variable $$y = \frac{1}{t}\int_0^T f(t)\,dt$$

rather than a fixed $\bar{x}$ is used. In this way the value $$CV = \frac{1}{y}\sqrt{\frac{1}{T}\int_0^T [f(t) - y]^2 dt} \qquad [5]$$

is obtained for the measuring interval (O–T). In order to design an apparatus which forms the coefficient of variation CV in accordance with formula [5] from a variable function, it is necessary for the value $$y = \frac{1}{t}\int_0^T f(t)\,dt$$

to be formed from the variable function and for the function $f(t)$ to be subtracted as subtrahend from the instantaneous value of the function $f(t)$, after which this difference is squared, integrated and its root extracted, giving the coefficient of variation CV after division by the average value $y$.

This process is carried out with a circuit of the kind shown in FIG. 2. The variable function $f(t)$ occurring in the form of an electrical signal is initially applied to a first RC-network 11 with a variable resistor 12 and a variable capacitor 13 providing a variable time constant. The change in the time constant RC is carried out in such a way that it is increased from a minimum value, preferably the value zero, throughout the entire measuring interval in accordance with the relation $$R.C = k.t \ (\ k = \text{constant}\ )$$

At the same time, the value $y$ which always corresponds to the average value of the function $f(t)$ which has elapsed since the beginning of the measuring interval, appears at the output 14 of the RC-network. This average value $y$ on the one hand and the original function $f(t)$ on the other hand are then applied to a subtractor 15 known per se which forms the difference $f(t) - y$ and delivers it to a squaring network 16 known per se in which the square $[f(t) - y]^2$ is formed as another electrical quantity.

This square is then applied to another RC-network 20 with a variable resistor 21 and a variable capacitor 22 providing a variable time constant RC. Providing the change of RC again corresponds to the relation $$R.C. = k \cdot t \quad (k = \text{constant})$$

the electrical quantity arriving at the output 23 of the additional RC-network 20 corresponds at any moment to the value $$s_x^2 = \frac{1}{t_x} \int_0^{t_x} [f(t) - y]^2 dt$$

of the function f(t) which has elapsed from the beginning of measurement to the time $t_x$.

$s_x^2$ then has its root extracted in a known manner and is divided by y, the instantaneous value $$CV_t = \frac{1}{y} \sqrt{\frac{1}{t_x} \int_0^{t_x} [f(t) - y]^2 dt}$$

being formed at any moment at the output of the circuit. On expiration of the measuring interval ( O-T ), $$y = \frac{1}{T} \int_0^T f(t) dt = \bar{x}$$

i.e., equal to the actual average value of the function f(t) over the interval (O-T) and the value $CV_t$ becomes $$CV = \frac{1}{\bar{x}} \sqrt{\frac{1}{T} \int_0^T [f(t) - y]^2 dt} \qquad [6]$$

It can now be shown that:

$$\frac{1}{\bar{x}} \sqrt{\frac{1}{T} \int_0^T [f(t) - y]^2 dt} = \frac{1}{\bar{x}} \sqrt{\frac{1}{T} \int_0^T [f(t) - x]^2 dt} = CV_{th}$$

The value CV obtained by the circuit described above is thus equal to the theoretical exact value $CV_{th}$. Since no difference occurs under the root signal in formula [6] as in formulas [2] or [3] for example, the requirements which the accuracy of the measuring circuits has to satisfy are not overstringent either.

Apparatus with the circuit arrangement according to the invention are preferably used as integrators, in which case the variable function f(t) represents for example an electrical quantity corresponding to the cross-sectional pattern or to the diameter pattern of products of the textile industry such as slivers, rovings and yarns. Uniformity-testing instruments known per se are used to obtain this electrical quantity.

The change in the time constants of the variable RC-networks can be carried out for example by having either the resistors 21 or 12 or the capacitors 13 or 22 or both at the same time suitably varied from a suitable control element 25.

Different embodiments known per se are available for the design of the variable RC-networks 11, 20. The most obvious design with potentiometers creates difficulties insofar as it is necessary to use extremely high impedance potentiometers which naturally do not have the requisite resistance characteristic and do not satisfy the demands made of them.

By contrast, modern electronics have resulted in the development of variable resistors which can be controlled by in response to an electrical or optical control quantity, such as NTC-, PTC-resistors, photoresistances, phototransistors, photodiodes or even transistors or diodes incorporated in suitable circuits. With these elements, the resistance values required can be obtained sufficiently accurately and reproducibly.

Particularly advantageous behavior for producing changes in resistance of the requisite magnitude is shown by choppers in whose case the requisite change is resistance is obtained by changing the ratio between opening and closing times. The chopper can be in the form of a mechanical or electronic chopper as known per se.

For forming the quotient Sx/y in the divider 27, it is of advantage to use an analog-digital converter known per se to which the quantity y is fed as the reference voltage and the quantity s as the measuring voltage. Digital signals representing the ratio s/y are formed at the output of this converter.

Elements known per se such as voltage-variable diodes or circuits which behave like variable capacitors under the influence of a control quantity, are similarly available for representing variable capacitors.

I claim:

1. A method of determining the average quadratic deviation also known as the coefficient of variation CV, of a function f(t), variable with time t, from its average value, comprising the steps of:

generating a first signal representative of said function f(t);

applying said first signal to a first resistor-capacitor network, the time constant T of which increases from a minimum value to produce a second signal $$y = \frac{1}{T} \int_0^T f(t) dt;$$

delivering first and second signals f(t) and y, respectively, to a subtraction network to produce a third signal, representative of the difference [f(t) − y] between said first and second signals;

applying said third signal to a squaring circuit to produce a fourth signal representative of the square [f(t) − y]² of said third signal;

delivering said fourth signal to a second resistor-capacitor network, the time constant T' of which is variable over an interval to produce a fifth signal $$s^2 = \frac{1}{T'} \int_0^{T'} [f(t) - y]^2 dt;$$

applying said fifth signal $s^2$ to a root extracting network to produce a sixth signal $$s = \sqrt{\frac{1}{T'} \int_0^{T'} [f(t) - y]^2 dt};$$

and
combining said second and sixth signals in a division network to produce an output signal $$CV = \frac{1}{y} \sqrt{\frac{1}{T'} \int_0^{T'} [f(t) - y]^2 dt}.$$

2. An apparatus for determining the average quadratic deviation, also known as the coefficient of variation CV of an input signal representative of a function $f(t)$, variable with time t, from its average value, comprising:
first means, responsive to said input signal for producing a second signal representative of the integral of said input signal over a time interval T;
and second means responsive to said second signal and said input signal for generating a third signal representative of the ratio of the square root of the integral of the square of the difference between said input signal and said second signal over a time interval T' and said second signal,
whereby said ratio signal representative of said coefficient of variation CV is produced.

3. An apparatus according to claim 2, wherein said second means, comprises a subtracting means, responsive to said input signal and to said second signal, for generating a difference signal representative of the difference between said input signal and said second signal.

4. An apparatus according to claim 3, wherein said second means further comprises a squaring means, responsive to said difference signal, for generating a squared signal representative of the square of said difference signal.

5. An apparatus according to claim 4, wherein said second means further comprises an output integrating network, responsive to said squared signal, for generating an integral signal representative of the integral of said squared signal over a time interval T'.

6. An apparatus according to claim 5, wherein said second means further includes a root extracting means, responsive to said integral signal, for generating a root signal representative of the square root of said integral signal.

7. An apparatus according to claim 6, wherein said second means further comprises a division means, responsive to said second signal and to said root signal for generating said ratio signal representative of the coefficient of variation CV corresponding to the ratio of said root signal and said second signal.

8. An apparatus according to claim 7, wherein said first means comprises a first resistor-capacitor network for generating the integral of said input signal.

9. An apparatus according to claim 8, wherein said output integrating network comprises a second resistor-capacitor network for generating the integral of said squared signal.

10. An apparatus according to claim 9, further including means for controlling the time constants of each of said resistor-capacitor networks.

11. An apparatus according to claim 9, further including means for controlling the time constants of first resistor-capacitor network.

12. An apparatus according to claim 9, further including means for controlling the time constant of said second resistor-capacitor network.

13. An apparatus according to claim 10, wherein at least one of the resistors and capacitors of said resistor-capacitor networks are variable.

14. An apparatus according to claim 13, wherein both of the resistors and capacitors of said resistor-capacitor networks are variable.

15. An apparatus according to claim 10, wherein said time constant controlling means includes means for continuously increasing the time constant of each resistor-capacitor network during the period of integration of each resistor-capacitor network.

16. An apparatus according to claim 15, wherein said time constant controlling means comprises means for increasing the time constant of each resistor-capacitor network in direct proportion to the lapse of time from the start of the period of integration.

17. A method according to claim 1 further including the step of increasing the resistance of each resistor-capacitor network from the start of the production of said second and fifth signals in direct proportion to the lapse of time.

18. A method according to claim 1, further including the step of increasing the capacitance of each resistor-capacitor network from the start of the production of said second and fifth signals in direct proportion to the lapse of time.

19. A method according to claim 17, wherein the step of increasing said resistance comprises varying the ratio of the opening and closing of a chopper.

20. A method according to claim 19, further comprising the step of mechanically varying the opening and closing of said chopper.

21. A method according to claim 19, further including the step of electronically varying the opening and closing of said chopper.

22. An apparatus according to claim 10 wherein said control means comprises a drive motor, the drive output of which is ganged to the resistors of each resistor-capacitor network.

23. An apparatus according to claim 10, wherein said control means comprises a drive motor, the output of which is ganged to the capacitors of each resistor-capacitor network.

24. An apparatus according to claim 10, wherein said control means comprises a drive motor, the drive output of which is ganged to both the resistors and capacitors of each resistor-capacitor network.

25. An apparatus according to claim 9, wherein the resistors of said resistor-capacitor networks are controllable semiconductor resistors selected from the group consisting of NTC-resistors, PTC-resistors, photoresistors, phototransistors, photodiodes and interconnected transistor-diode networks.

26. An apparatus according to claim 9, wherein said capacitors of said resistor-capacitor networks comprise voltage-variable diodes.

27. An apparatus according to claim 7, wherein said division means comprises an analog-to-digital converter with said root signal as the measuring voltage therefor and said second signal as the reference voltage therefor.

* * * * *